United States Patent Office.

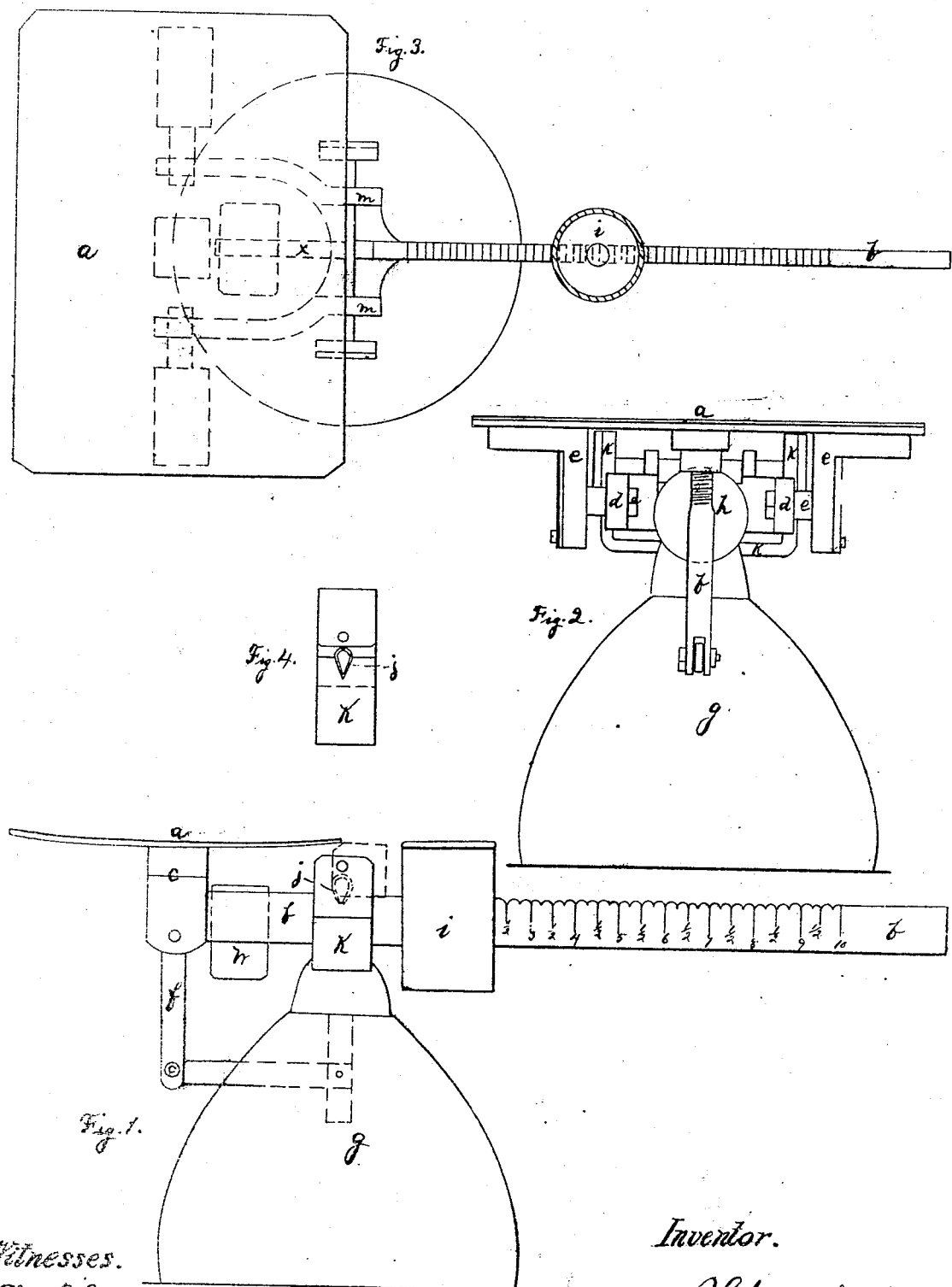

BENJAMIN CHAMBERS, JR., OF WASHINGTON, DISTRICT OF COLUMBIA.

Letters Patent No. 75,244, dated March 10, 1868.

IMPROVEMENT IN LETTER-BALANCES.

*The Schedule referred to in these Letters Patent and making part of the same.*

TO ALL WHOM IT MAY CONCERN:

Be it known that I, BENJAMIN CHAMBERS, Jr., of the city of Washington, in the District of Columbia, have invented a certain new and useful Improvement on Letter-Balances; and I do hereby declare that the following is a full, clear, and exact description thereof, reference being had to the accompanying drawings, and to the letters and marks thereon, which said drawings form part of this specification, and represent a letter-balance constructed under my invention—

Figure 1 thereof being a side view.
Figure 2, an end view.
Figure 3, a top view; and
Figure 4 a side view of one of the lugs supporting the knife-edge.

In each of these figures, where like parts are shown, like marks and letters are used to indicate the parts.

As usually constructed, the dish $a$ of the letter-balance is affixed to the beam $b$ at or near its centre. When so affixed or attached, the dish is apt to tilt when any weight or letter or package to be weighed is placed near its edge or corners, so that in the hurry and dispatch of business the weighing of the letters and packages will be imperfect and incorrect. In order to remedy this objection to letter-balances, I make the beam $b$, at its dish-end, forked, as is plainly indicated by the dotted lines of fig. 3. The forking of the beam allows the lugs in which the knife-edges play to be placed towards the ends of the dish, thus affording a steady and broad bearing to the dish, and when the weight or package or letter to be weighed is thrown on the edge or corner of the dish the weighing will be as perfect and accurate as when thrown on the centre of the dish. The lugs of the dish are marked $c$, the forked ends of the beam $d$, and the knife-edges $e$. From the middle of the fork a rod, $+$, passes out towards a vertical rod, $f$, attached at its upper end to the centre of the dish, and its lower jointed to a horizontal vibrating-rod, which is also jointed to a rod placed vertically, and permanently fixed inside of the base, $g$. This arrangement of rods is fully shown by figs. 1, 2, and 3. On the horizontal rod $+$ is placed a regulating-nut, $h$, that by means of screw-threads can be moved back and forth, and thus keeping the balance always in trim when the weight $i$ is at 0. The balancing knife-edges $j$ of the beam have their bearings in uprights $k$, from the top of the base-block $g$, which uprights are of one continuous piece of metal, as shown by fig. 2, the middle of the piece being attached to the top of the base-block by a screw or its equivalent. The bearings of the knife-edges $j$ are in holes in the uprights $k$, so that the whole balance can be lifted up by the beam, the knife-edges keeping in the holes. The knife-edges are prevented passing out endwise through the holes by small plates covering the holes, the plate of one side being pivoted, as shown by fig. 4, and when this plate is turned up, as there shown, the beam can be removed from the uprights. The graduated scale, as is shown by fig. 1, is upon the side of the beam $b$, the notches being on the top edge of the beam, and the weight $i$, by a hole or slot, allows to be moved back and forth on the beam. The knife-edges $e$ are fitted in the holes of the lugs $c$, like the knife-edges $j$, having the plates to cover the holes, one of which may be pivoted, as shown by fig. 4, so as to allow the dish to be removed from the beam. The beam $b$, I usually make by casting it as one piece of metal, the ears $m$, through which the balancing knife-edges pass, and the forked ends $d$, being a part thereof.

What I claim as my invention, and desire to secure by Letters Patent, is—

The knife-edges in holes passing through the lugs, as herein described, and covered, the covering plate at one end being pivoted, whereby the knife-edges are kept in place, and can be readily removed when it is required to remove them.

This specification signed this 30th day of January, 1868.

B. CHAMBERS, JR.

Witnesses:
 THOS. T. EVERETT,
 THOS. T. PARKER.